(12) United States Patent
Goldenberg et al.

(10) Patent No.: US 11,106,018 B2
(45) Date of Patent: Aug. 31, 2021

(54) FOLDED CAMERA PRISM DESIGN FOR PREVENTING STRAY LIGHT

(71) Applicant: Corephotonics Ltd., Tel-Aviv (IL)

(72) Inventors: Ephraim Goldenberg, Ashdod (IL); Roy Rudnick, Tel Aviv (IL); Michael Dror, Nes Ziona (IL); Itay Yedid, Karme Yosef (IL); Gil Bachar, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 46 days.

(21) Appl. No.: 16/306,565

(22) PCT Filed: Jul. 3, 2018

(86) PCT No.: PCT/IB2018/054928
§ 371 (c)(1),
(2) Date: Dec. 1, 2018

(87) PCT Pub. No.: WO2019/008517
PCT Pub. Date: Jan. 10, 2019

(65) Prior Publication Data
US 2021/0048649 A1    Feb. 18, 2021

Related U.S. Application Data

(60) Provisional application No. 62/529,496, filed on Jul. 7, 2017.

(51) Int. Cl.
*G02B 17/00* (2006.01)
*G02B 13/00* (2006.01)
(Continued)

(52) U.S. Cl.
CPC .......... *G02B 13/0065* (2013.01); *G02B 5/04* (2013.01); *G03B 11/045* (2013.01); *G03B 17/17* (2013.01); *H04N 5/2254* (2013.01)

(58) Field of Classification Search
CPC .... G02B 13/0065; G02B 5/04; G03B 11/045; G03B 17/17; H04N 5/2254
(Continued)

(56) References Cited

U.S. PATENT DOCUMENTS

| 2,106,752 A | 2/1938 | Land |
| 2,354,503 A | 7/1944 | Arthur |

(Continued)

FOREIGN PATENT DOCUMENTS

| CN | 102193162 A | 9/2011 |
| CN | 102147519 B | 1/2013 |

(Continued)

OTHER PUBLICATIONS

European Search Report in related EP patent application 18819517.6, dated May 31, 2019. 4 pages.

(Continued)

*Primary Examiner* — William Choi
(74) *Attorney, Agent, or Firm* — Nathan & Associates; Menachem Nathan (57) ABSTRACT

Folded cameras comprising a lens having a lens optical axis, an image sensor and a prism for folding light from a first optical path to a second optical path along the lens optical axis towards the image sensor, wherein the camera has a full camera cone of vision, wherein the prism intersects the full camera cone of vision, and wherein a camera has a construction that prevents double reflected stray light from reaching the image sensor.

4 Claims, 10 Drawing Sheets

(51) Int. Cl.
  *G02B 5/04* (2006.01)
  *G03B 11/04* (2021.01)
  *G03B 17/17* (2021.01)
  *H04N 5/225* (2006.01)

(58) Field of Classification Search
  USPC .................................. 359/726, 738; 348/335
  See application file for complete search history.

(56) References Cited

U.S. PATENT DOCUMENTS

| | | | |
|---|---|---|---|
| 2,378,170 | A | 6/1945 | Aklin |
| 2,441,093 | A | 5/1948 | Aklin |
| 3,388,956 | A | 6/1968 | Eggert et al. |
| 3,524,700 | A | 8/1970 | Eggert et al. |
| 3,558,218 | A | 1/1971 | Grey |
| 3,864,027 | A | 2/1975 | Harada |
| 3,942,876 | A | 3/1976 | Betensky |
| 4,134,645 | A | 1/1979 | Sugiyama et al. |
| 4,338,001 | A | 7/1982 | Matsui |
| 4,465,345 | A | 8/1984 | Yazawa |
| 5,000,551 | A | 3/1991 | Shibayama |
| 5,969,869 | A | 10/1999 | Hirai et al. |
| 6,147,702 | A | 11/2000 | Smith |
| 6,169,636 | B1 | 1/2001 | Kreitzer |
| 6,654,180 | B2 | 11/2003 | Ori |
| 7,187,504 | B2 | 3/2007 | Horiuchi |
| 7,206,136 | B2 | 4/2007 | Labaziewicz et al. |
| 7,515,351 | B2 | 4/2009 | Chen et al. |
| 7,564,635 | B1 | 7/2009 | Tang |
| 7,643,225 | B1 | 1/2010 | Tsai |
| 7,660,049 | B2 | 2/2010 | Tang |
| 7,684,128 | B2 | 3/2010 | Tang |
| 7,688,523 | B2 | 3/2010 | Sano |
| 7,692,877 | B2 | 4/2010 | Tang et al. |
| 7,697,220 | B2 | 4/2010 | Iyama |
| 7,738,186 | B2 | 6/2010 | Chen et al. |
| 7,777,972 | B1 | 8/2010 | Chen et al. |
| 7,813,057 | B2 | 10/2010 | Lin |
| 7,821,724 | B2 | 10/2010 | Tang et al. |
| 7,826,149 | B2 | 11/2010 | Tang et al. |
| 7,826,151 | B2 | 11/2010 | Tsai |
| 7,869,142 | B2 | 1/2011 | Chen et al. |
| 7,898,747 | B2 | 3/2011 | Tang |
| 7,916,401 | B2 | 3/2011 | Chen et al. |
| 7,918,398 | B2 | 4/2011 | Li et al. |
| 7,957,075 | B2 | 6/2011 | Tang |
| 7,957,076 | B2 | 6/2011 | Tang |
| 7,957,079 | B2 | 6/2011 | Tang |
| 7,961,406 | B2 | 6/2011 | Tang et al. |
| 8,000,031 | B1 | 8/2011 | Tsai |
| 8,004,777 | B2 | 8/2011 | Yoshihito Souma |
| 8,077,400 | B2 | 12/2011 | Tang |
| 8,149,523 | B2 | 4/2012 | Ozaki |
| 8,218,253 | B2 | 7/2012 | Tang |
| 8,228,622 | B2 | 7/2012 | Tang |
| 8,233,224 | B2 | 7/2012 | Chen |
| 8,253,843 | B2 | 8/2012 | Lin |
| 8,279,537 | B2 | 10/2012 | Sato |
| 8,363,337 | B2 | 1/2013 | Tang et al. |
| 8,395,851 | B2 | 3/2013 | Tang et al. |
| 8,400,717 | B2 | 3/2013 | Chen et al. |
| 8,451,549 | B2 | 5/2013 | Yamanaka et al. |
| 8,503,107 | B2 | 8/2013 | Chen et al. |
| 8,514,502 | B2 | 8/2013 | Chen |
| 8,570,668 | B2 | 10/2013 | Takakubo et al. |
| 8,718,458 | B2 | 5/2014 | Okuda |
| 8,780,465 | B2 | 7/2014 | Chae |
| 8,810,923 | B2 | 8/2014 | Shinohara |
| 8,854,745 | B1 | 10/2014 | Chen |
| 8,958,164 | B2 | 2/2015 | Kwon et al. |
| 9,185,291 | B1 | 11/2015 | Shabtay et al. |
| 9,229,194 | B2 | 1/2016 | Yoneyama et al. |
| 9,235,036 | B2 | 1/2016 | Kato et al. |
| 9,279,957 | B2 | 3/2016 | Kanda et al. |
| 9,438,792 | B2 | 9/2016 | Nakada et al. |
| 9,488,802 | B2 | 11/2016 | Chen et al. |
| 9,568,712 | B2 | 2/2017 | Dror et al. |
| 9,678,310 | B2 | 6/2017 | Iwasaki et al. |
| 9,817,213 | B2 | 11/2017 | Mercado |
| 2002/0118471 | A1 | 8/2002 | Imoto |
| 2005/0041300 | A1 | 2/2005 | Oshima et al. |
| 2005/0062346 | A1 | 3/2005 | Sasaki |
| 2005/0128604 | A1 | 6/2005 | Kuba |
| 2005/0141103 | A1 | 6/2005 | Nishina |
| 2005/0168840 | A1 | 8/2005 | Kobayashi et al. |
| 2005/0270667 | A1 | 12/2005 | Gurevich et al. |
| 2007/0229983 | A1 | 10/2007 | Saori |
| 2008/0056698 | A1 | 3/2008 | Lee et al. |
| 2008/0304161 | A1 | 12/2008 | Souma |
| 2009/0002839 | A1 | 1/2009 | Sato |
| 2009/0122423 | A1 | 5/2009 | Park et al. |
| 2009/0141365 | A1 | 6/2009 | Jannard et al. |
| 2009/0225438 | A1 | 9/2009 | Kubota |
| 2010/0165476 | A1 | 7/2010 | Eguchi |
| 2010/0277813 | A1 | 11/2010 | Ito |
| 2011/0001838 | A1 | 1/2011 | Lee |
| 2011/0115965 | A1 | 5/2011 | Engelhardt et al. |
| 2011/0149119 | A1 | 6/2011 | Matsui |
| 2011/0157430 | A1 | 6/2011 | Hosoya et al. |
| 2011/0188121 | A1 | 8/2011 | Goring et al. |
| 2012/0069455 | A1 | 3/2012 | Lin et al. |
| 2012/0075726 | A1* | 3/2012 | Takakubo .......... G02B 13/0065 |
| | | | 359/726 |
| 2012/0092777 | A1 | 4/2012 | Tochigi et al. |
| 2012/0105708 | A1 | 5/2012 | Hagiwara |
| 2012/0154929 | A1 | 6/2012 | Tsai et al. |
| 2012/0229920 | A1 | 9/2012 | Otsu et al. |
| 2012/0262806 | A1 | 10/2012 | Huang |
| 2013/0057971 | A1 | 3/2013 | Zhao et al. |
| 2013/0088788 | A1 | 4/2013 | You |
| 2013/0208178 | A1 | 8/2013 | Park |
| 2013/0279032 | A1 | 10/2013 | Suigetsu et al. |
| 2013/0286488 | A1 | 10/2013 | Chae |
| 2014/0022436 | A1 | 1/2014 | Kim et al. |
| 2014/0146216 | A1 | 5/2014 | Okumura |
| 2014/0204480 | A1 | 7/2014 | Jo et al. |
| 2014/0285907 | A1 | 9/2014 | Tang et al. |
| 2014/0293453 | A1 | 10/2014 | Ogino et al. |
| 2014/0362274 | A1 | 12/2014 | Christie et al. |
| 2015/0116569 | A1 | 4/2015 | Mercado |
| 2015/0253543 | A1 | 9/2015 | Mercado |
| 2015/0253647 | A1 | 9/2015 | Mercado |
| 2015/0373252 | A1 | 12/2015 | Georgiev |
| 2015/0373263 | A1 | 12/2015 | Georgiev et al. |
| 2016/0044250 | A1 | 2/2016 | Shabtay et al. |
| 2016/0062084 | A1 | 3/2016 | Chen et al. |
| 2016/0070088 | A1 | 3/2016 | Koguchi |
| 2016/0085089 | A1 | 3/2016 | Mercado |
| 2016/0187631 | A1 | 6/2016 | Choi et al. |
| 2016/0291295 | A1 | 10/2016 | Shabtay et al. |
| 2016/0306161 | A1 | 10/2016 | Harada et al. |
| 2016/0313537 | A1 | 10/2016 | Mercado |
| 2016/0341931 | A1 | 11/2016 | Liu et al. |
| 2016/0353008 | A1 | 12/2016 | Osborne |
| 2017/0102522 | A1 | 4/2017 | Jo |
| 2017/0115471 | A1 | 4/2017 | Shinohara |
| 2017/0160511 | A1 | 6/2017 | Kim et al. |
| 2018/0059365 | A1 | 3/2018 | Bone et al. |
| 2018/0217475 | A1 | 8/2018 | Goldenberg et al. |
| 2018/0224630 | A1 | 8/2018 | Lee et al. |
| 2019/0170965 | A1 | 6/2019 | Shabtay |

FOREIGN PATENT DOCUMENTS

| | | |
|---|---|---|
| CN | 104297906 A | 1/2015 |
| CN | 105467563 A | 4/2016 |
| JP | S54157620 A | 12/1979 |
| JP | S59121015 A | 7/1984 |
| JP | 6165212 A | 4/1986 |
| JP | S6370211 A | 3/1988 |
| JP | 406059195 A | 3/1994 |
| JP | 2007133096 A | 5/2007 |
| JP | 2007219199 A | 8/2007 |

(56) References Cited

FOREIGN PATENT DOCUMENTS

| | | | |
|---|---|---|---|
| JP | 2007306282 | A | 11/2007 |
| JP | 2010164841 | A | 7/2010 |
| JP | 2012203234 | A | 10/2012 |
| JP | 2013105049 | A | 5/2013 |
| JP | 2013106289 | A | 5/2013 |
| JP | 2014142542 | A | 8/2014 |
| KR | 20140135909 | A | 5/2013 |
| KR | 20140023552 | A | 2/2014 |
| WO | 2013058111 | A1 | 4/2013 |
| WO | 2013063097 | A1 | 5/2013 |

OTHER PUBLICATIONS

International Search Report and Written Opinion in related patent application PCT/IB2018/054928, dated Nov. 15, 2018. 9 pages.
"Cheat sheet: how to understand f-stops", Internet article, Digital Camera World, 2017.
A compact and cost effective design for cell phone zoom lens, Chang et al., Sep. 2007, 8 pages.
Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al. "Ultrathin Optics for Low-Profile Innocuous Imager", Sandia Report, 2009, pp. 56-56.

\* cited by examiner

FOLDED CAMERA PRISM DESIGN FOR PREVENTING STRAY LIGHT

CROSS REFERENCE TO RELATED APPLICATIONS

This application is a 371 application from international patent application PCT/IB2018/054928 filed Jul. 3, 2018, and claims the benefit of priority from U.S. Provisional patent application No. 62/529,496 filed Jul. 7, 2017, which is incorporated herein by reference in its entirety.

FIELD

Embodiments disclosed herein relate in general to folded cameras, and in particular to stray light in such folded cameras.

BACKGROUND

Folded cameras are known. They include a lens, an image sensor and a reflecting element such as a prism that folds an optical path from a first optical path to a second optical path that is substantially orthogonal to the first optical axis.

SUMMARY

Figure 1A:
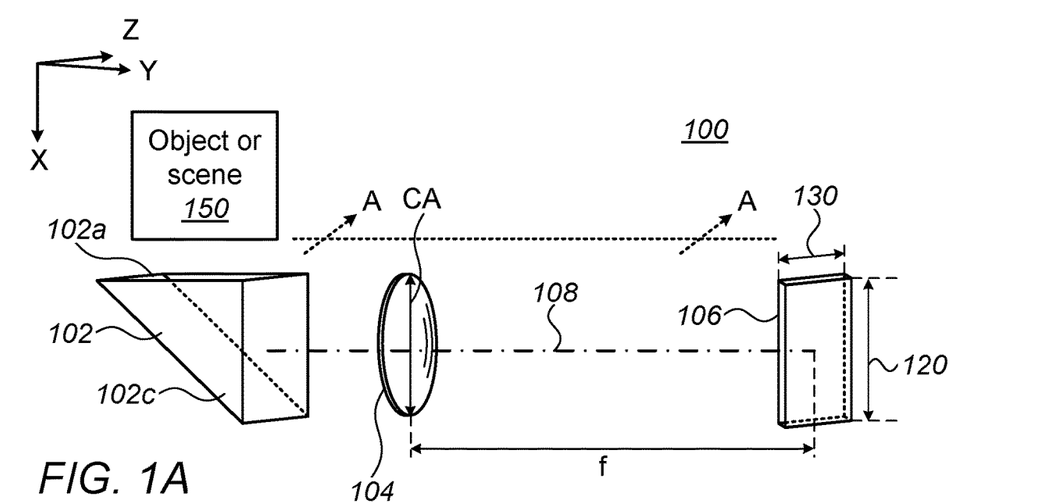
FIG. 1A shows schematically the design of a folded camera in an isometric view.

FIG. 1A shows schematically an example of such a folded camera numbered 100 in an isometric view. Camera 100 includes a prism 102 with a top (entrance) surface 102a, a front (exit) surface 102b and a light bending surface (reflection surface) 102c, as well as a lens 104 and an image sensor 106. Prism 102 (and all other prisms described in this application) is typically made from a material transparent to light such as glass, plastic, etc. Reflection surface 102c is typically covered with a reflective material (e.g. a metal or dielectric) such that the majority of light (more than 90%, or more than 99% or more than 99.9%) is reflected off the surface. Light arriving to entrance and exit surfaces 102a and 102b will pass through with some refractions, and may have some reflections due to change of refractive index of prism transparent material and air, and in particular in some cases may suffer from total internal reflection (TIR), as known in the art. Lens 104 is shown as a mathematical single element lens, having a focal length f, a clear aperture (CA), and an optical axis 108. Image sensor 106 is characterized by a height 120 and a width 130. Light arriving from a first optical path, along the X-direction (e.g. from an object or scene 150) is redirected (folded) by the prism 102 to a second optical path, along the Y direction i.e. into lens 104 and then into image sensor 106. Prism 102 has a prism length along entrance surface 102a in the Y direction parallel to optical axis 108 and a prism height along exit surface 102b in the X direction. Camera 100 has a full camera cone of vision as defined below.

Camera 100 (and all other camera embodiments below) may have other parts, which are not seen, such as (but limited to) a shield, a chassis for holding all elements together, an actuation mechanism allowing focusing and optical image stabilization, wiring, connectors to connect image sensor to a host of the camera, etc. In addition, other optical elements (e.g. lens, mirrors, prisms) may be added, and all analysis presented herein shall apply to such elements too. Camera 100 (and all other camera embodiments below) may be a part of (hosted in) various devices such as mobile phones, laptops, computes, tablets, vehicles (cars, motorcycles, tracks etc.), televisions, smart speakers, robots, drones, flying drones, etc. Camera 100 (and all other camera embodiments below) may be integrated with another camera (folded or non-folded) to form a dual camera.

The coordinate system shown in FIG. 1A holds for all figures. The X direction is parallel to the second optical path and the Y direction is parallel to the first optical path, The Z direction is perpendicular to the X-Y plane.

As used herein, the terms "top" or "upper" refer to a side of the folded camera that is closer to and facing object or scene 150 along X, while "bottom", "below" or "lower" refers to a side of the folded camera that is farthest and facing away from the imaged object or scene 150 along X. As used herein, the term "back" refers to a side of the folded camera that is farthest from image sensor 106 along Y, while "front" refers to a side of the folded camera that is closest to image sensor 106 along Y. As used herein, length is measured along the second optical path (Y direction), height is measured along the first optical path (X direction) and depth is measured in the Z direction.

Figure 1B:
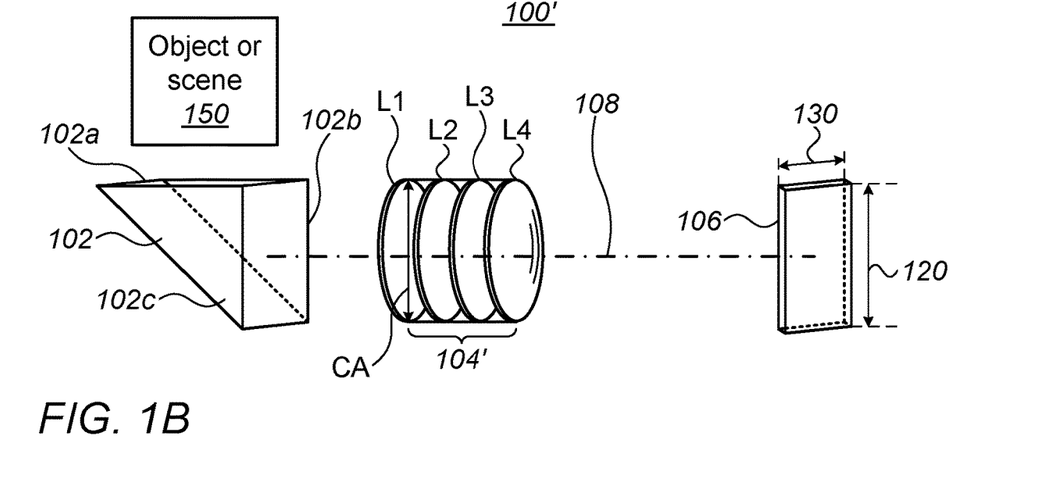
FIG. 1B shows schematically the design of another folded camera in an isometric view.

FIG. 1B shows schematically another example of a folded camera (or simply camera) numbered 100'. Camera 100' is similar to camera 100, except that the single element lens 104 is replaced by a lens assembly (also referred to simply as "lens") 104' that includes several (in this case, and for example, four) lens elements having a common optical axis 108. In this case, lens assembly 104' will have a clear aperture of the first lens element L1 from an object side and a constant effective focal length (EFL), the EFL replacing f. EFL is the mathematical equivalent of magnification given by lens assembly 104' to a single lens element. The analysis below applies to the multiple lens element case. Note that the number of lens elements may differ from the four shown and may be any number between, for example, 4 and 7. Construction and design of lens consisting of multiple lens elements is known in the art, see for example co-owned U.S. Pat. No. 9,392,188.

Figure 1C:
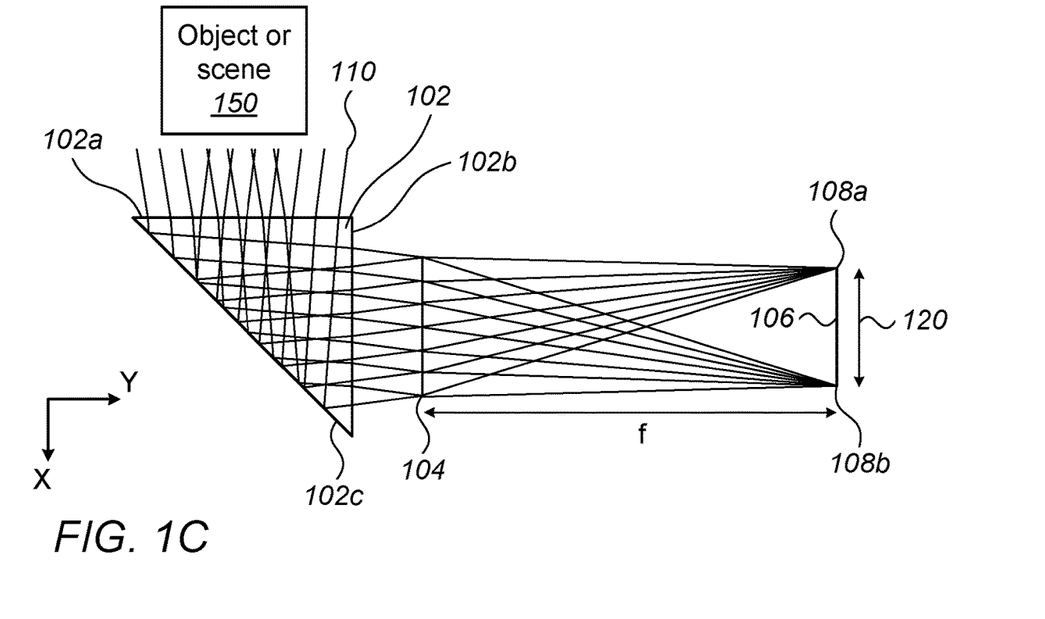
FIG. 1C shows a ray tracing diagram in a cross section of the folded camera of FIG. 1A along a line A-A seen in FIG. 1A.

FIG. 1C shows a ray tracing diagram in a cross section of folded camera 100 along a cut line A-A seen in FIG. 1A, the cut passing in the center of lens 104, i.e. through optical axis 108. The ray tracing diagram shows the trajectory of several image forming light rays 110 that enter prism 102, continue to lens 104 and end at image sensor 106. In FIG. 1C, only the trajectory of the rays reaching of the two most extreme points 106a and 106b on image sensor 106 are seen. The figures following (1D-1F, 2A-C, 3A-C, 4, 5A-B and 6A) show various folded cameras from a side cut with ray tracing, where in these figures only selected number of rays are displayed to emphasize the inventive steps. All these figures are two-dimensional cuts, illustrative such that a person skilled in the art could understand the implication on three dimensional (3D) cameras having depth and on light rays which are not shown.

Figure 1D:
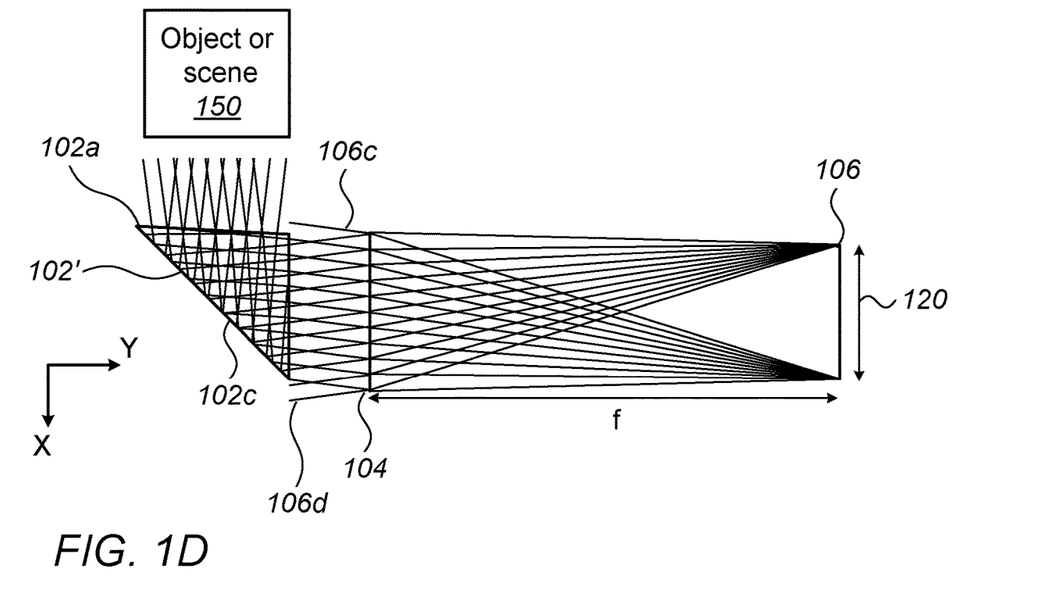
FIG. 1D shows an example of a folded camera with a small prism height.

Due to camera size limitations, and in particular due to camera height concerns (height being measured along the first optical path in the X direction), in many cases the prism of a folded camera has a reduced size (i.e. smaller entrance and exit surfaces) such that not all the rays in the full camera cone of vision can enter the prism and be reflected to the lens and sensor. FIG. 1D shows a case in which a prism 102' has a smaller height than prism 102 of FIGS. 1A-1C. Consequently, some potentially image forming rays, marked 108a and 108b cannot arrive from the object through the prism to the lens. In such cases, stray light (SL) can enter the lens from the prism, as described below. In FIG. 1D, the full camera cone of vision is illustrated via image forming rays going from the image to the object. By definition, the full camera cone of vision contains the extension of all the rays exiting the camera. FIG. 1D shows that prism 102' resides within (i.e. intersects) the full camera cone of vision.

In all the following figures, solid rays indicate image forming rays while dashed rays indicate SL rays.

Figure 1E:
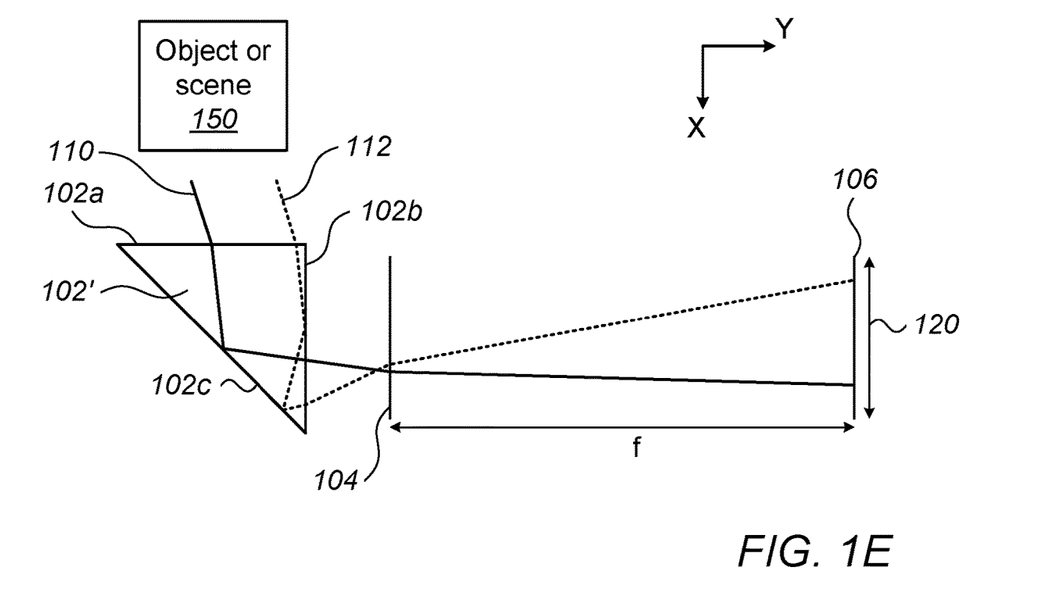
FIG. 1E shows schematically one problem encountered in folded cameras.

FIG. 1E shows schematically one problem encountered in folded cameras in which prism intersects the full camera cone of vision: while most light rays such as image forming rays 110 are folded by prism 102' to pass through lens 104 and form an image on the image sensor 106, some light rays such as stray rays 112 are SL rays that need to be prevented from reaching the image sensor. In a prism, a special case of SL may exist when a light ray undergoes internal reflection inside the prism and enters the lens. Such a ray will undergo double reflection—one reflection in reflection surface 102c and another reflection in another surface, like entrance surface 102a and/or exit surface 102b. In the case presented in FIG. 1E, a stray ray 112 enters prism 102' through entrance surface 102a, is first reflected from exit surface 102b and then reflected from reflection surface 102c, and exits through exit surface 102b to reach lens 104 and image sensor 106. Namely, ray 112 has one extra reflection from exit surface 102b relative to rays 110. Light rays like stray ray 112 will be considered to be "double reflected SL" (DRSL) of type 1.

Figure 1F:
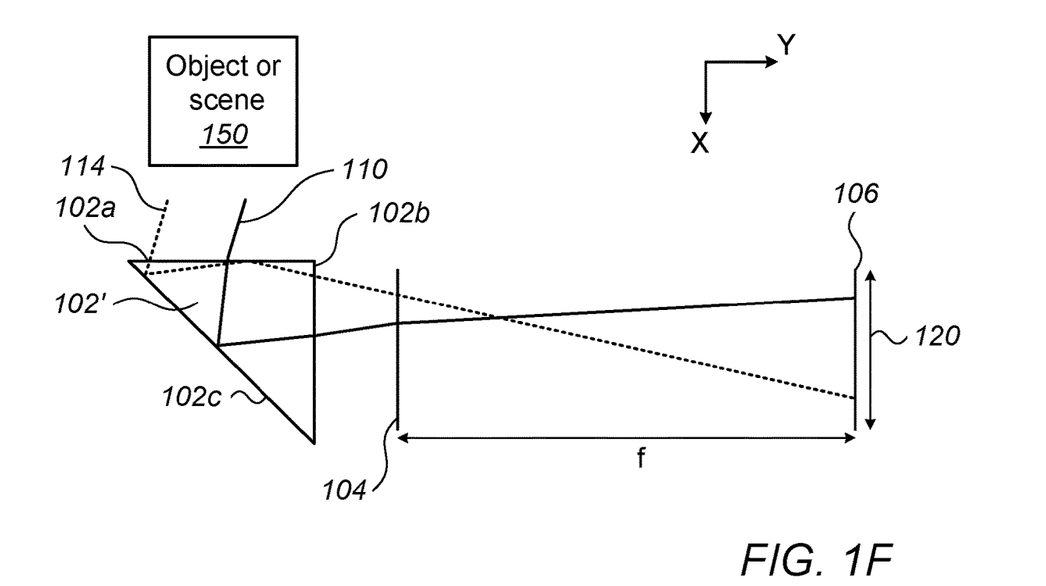
FIG. 1F shows schematically another problem with folded cameras.

FIG. 1F shows schematically another problem with folded cameras. In the case presented in FIG. 1F, a stray ray 114 enters prism 102' through entrance surface 102a, is first reflected from reflection surface 102c and then reflected from entrance surface 102a, and exits through exit surface 102b to reach lens 104 and image sensor 106. Namely, ray 114 has one extra reflection from entrance surface 102a relative to rays 110. Light rays like stray ray 114 seen in FIG. 1F will be considered to be DRSL of type 2.

Definitions

"Full lens aperture": an aperture having the shape and size of a maximum optically useable first lens element object side surface, i.e. all the surface with a sag, defined by a lens formula, where the sag is the optical axis component of the surface displacement from a surface vertex.

"Actual lens aperture": an aperture having the shape and size of a first lens element object side surface open to incoming light rays, i.e. not blocked by a lens barrel. An actual lens aperture can be very close to (i.e. of substantially the same shape and size as) a full lens aperture, or it can be smaller than a full lens aperture if the lens barrel is designed to block a significant area of the full lens aperture. In the latter case (also referred to as "blocked lens aperture") the actual lens aperture will have a different shape than the full lens aperture, for example the full lens aperture can be circular and the blocked lens aperture can have the shape of a D-cut circle, i.e. a circular aperture cut by one or more chords (see for example FIGS. 6C-E).

"Full camera cone of vision": a cone-like geometrical shape formed by the position and direction of all the rays in object space that can impinge a full lens aperture and an image plane to form an image. The full camera cone of vision is determined by a combination of lens focal length, lens clear aperture and sensor dimensions. The cone-like shape intersects the lens clear aperture and its tangent angles are determined by sensor dimensions divided by the lens focal length.

"Blocked camera cone of vision": a cone-like geometrical shape formed by position and direction of all the rays in object space that can impinge a blocked lens aperture and an image plane to form an image.

In various embodiments there are provided folded cameras, comprising: a lens having a lens optical axis, an image sensor and a prism for folding light from a first optical path to a second optical path towards the image sensor, the second optical path being along the lens optical axis, wherein the camera has a full camera cone of vision, wherein the prism intersects the full camera cone of vision, and wherein the folded camera has a construction that prevents double reflected stray light (DRSL) from reaching the image sensor.

In an exemplary embodiment, the camera construction to prevent DRSL from reaching the image sensor includes a light blocking element positioned between the lens and the prism. In some exemplary embodiments, the camera construction to prevent DRSL from reaching the image sensor includes a facet formed at the bottom of the prism, wherein the facet has a length that is sufficient to prevent DRSL type 1 rays from reaching the image sensor. In an embodiment, the facet formed at the bottom of the prism is tilted such as to prevent DRSL type 3 rays from reaching the image sensor. In an embodiment, the facet formed at the bottom of the prism is covered by an opaque mask.

In an exemplary embodiment, the camera construction to prevent DRSL from reaching the image sensor includes a cover positioned on an entrance (top) surface and/or an exit surface of the prism.

In some exemplary embodiments, the camera construction to prevent DRSL from reaching the image sensor includes a side facet formed on the prism. In an embodiment, the side facet is tilted such as to prevent DRSL type 2 rays from reaching the image sensor. In an embodiment, the side facet is covered by an opaque mask.

In an exemplary embodiment, the camera construction to prevent DRSL from reaching the image sensor includes a tilted bottom facet formed on the prism.

In some embodiments, the prism does not intersect a blocked cone of vision. In some such embodiments, the lens has a circular full lens aperture and wherein an actual lens aperture has a D-cut circle shape.

In various embodiments there are provided methods, comprising: providing a folded camera that includes a lens having a lens optical axis, an image sensor and a prism for folding light from a first optical path to a second optical path along the lens optical axis towards the image sensor, wherein the camera has a full camera cone of vision and wherein the prism intersects the full camera cone of vision, and constructing the folded camera such as to prevent DRSL from reaching the image sensor.

In an exemplary embodiment, the constructing the folded camera such as to prevent DRSL from reaching the image sensor includes a positioning a light blocking element between the lens and the prism.

In some exemplary embodiments, the constructing the folded camera such as to prevent DRSL from reaching the image sensor includes forming a facet formed at the bottom of the prism, wherein the facet has a length that is sufficient to prevent DRSL type 1 rays from reaching the image sensor. In an embodiment, the facet formed at the bottom of the prism is tilted such as to prevent DRSL type 3 rays from reaching the image sensor.

In an exemplary embodiment, the constructing the folded camera such as to prevent DRSL from reaching the image sensor includes positioning a cover on an entrance surface and/or an exit surface of the prism.

In an exemplary embodiment, the constructing the folded camera such as to prevent DRSL from reaching the image sensor includes forming a tilted side facet on the prism.

In various embodiments, the prism does not intersect a blocked cone of vision. In some such embodiments, the lens has a circular full lens aperture and wherein an actual lens aperture has a D-cut circle shape.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by the same numerals.

DETAILED DESCRIPTION

Figure 2A:
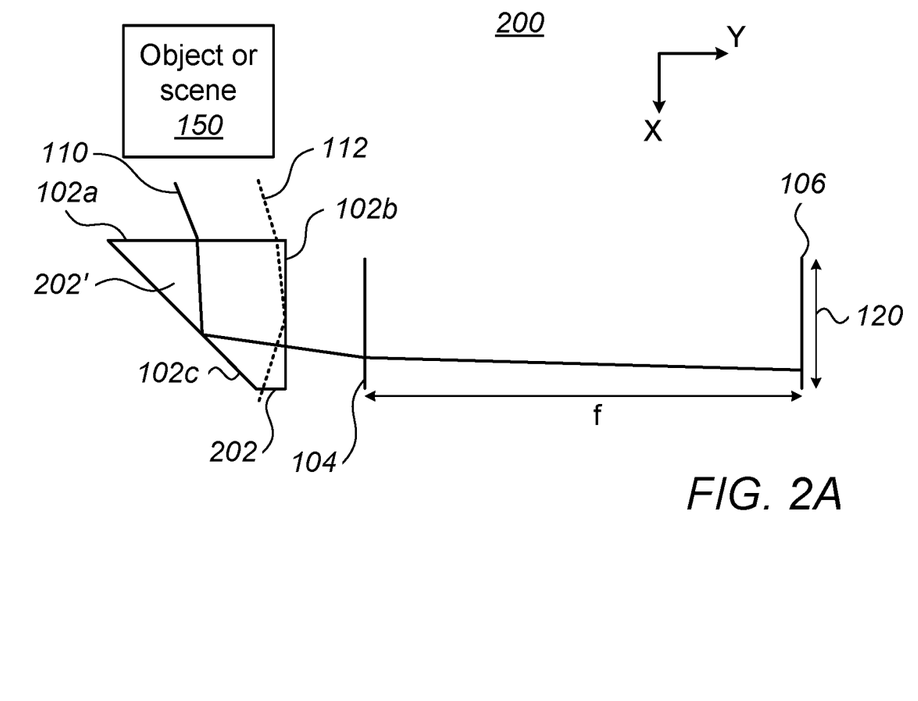
FIG. 2A shows schematically a camera embodiment for preventing DRSL of type 1.

FIG. 2A shows schematically an example of a folded camera embodiment numbered 200. Here and in the following examples, the folded cameras have a full camera cone of vision and a prism that intersects the full camera cone of vision. Camera 200 has a construction that prevents DRSL of type 1 from reaching image sensor 106. As used herein, the term "camera construction" refers to structural elements of a camera and their arrangement. As used herein, the term "preventing DRSL" means "decreasing and/or totally eliminating DRSL". In this example, a prism 202' has (relative to prism 102') an added bottom facet or "face" 202 that enables stray rays 112 to exit the prism before the second reflection on reflection surface 102c. Bottom facet 202 is added between reflection surface 102c and exit surface 102b, i.e. on the bottom of prism 202'. Exemplary, bottom facet 202 is said to have a length that is sufficient to prevent DRSL type 1 rays from reaching the image sensor if 90% (or even 99%) of rays like stray ray 112 would not reach image sensor 106 due to exiting prism 202' through facet 202. Bottom facet 202 may optionally be covered by an opaque mask or material (not shown), such that stray rays 112 are blocked. For example, bottom facet 202 may have a length 5%-10% of the length (in the Y direction, along the optical axis direction) of entrance surface 102a. Bottom surface 202 may have the same depth as entrance surface 102a in the Z direction (perpendicular to the X-Y plane).

Figure 2B:
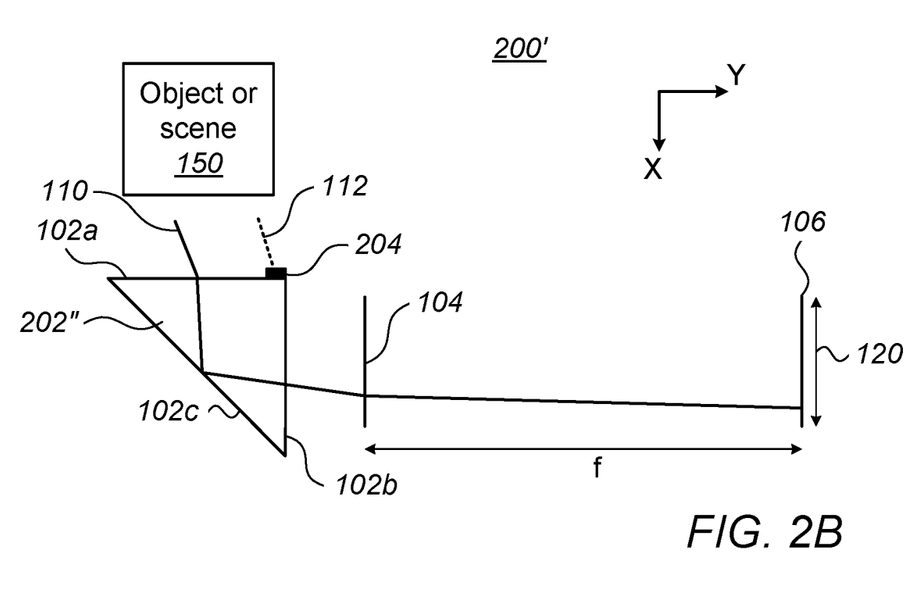
FIG. 2B shows schematically another camera embodiment for preventing DRSL of type 1.

FIG. 2B shows schematically another example of a folded camera embodiment numbered 200' that has a construction that prevents DRSL of type 1 from reaching image sensor 106. In this example, a prism 202" includes an added light blocking material or cover 204 (e.g. a black mask) formed on or attached to the front side of entrance surface 102a. Cover 204 may be formed for example by evaporation of, gluing of, or attachment of an opaque material. Cover 204 blocks stray rays 112 from entering prism 202". The cover may have an appropriate shape and size (for example be in the form of a stripe of a given length and width) to prevent DRSL of type 1 efficiently. For example, cover 204 may have a width 5%-10% of the length (in the Y direction) of entrance surface 102a and be the same depth as entrance surface 102a in the Z direction.

Figure 2C:
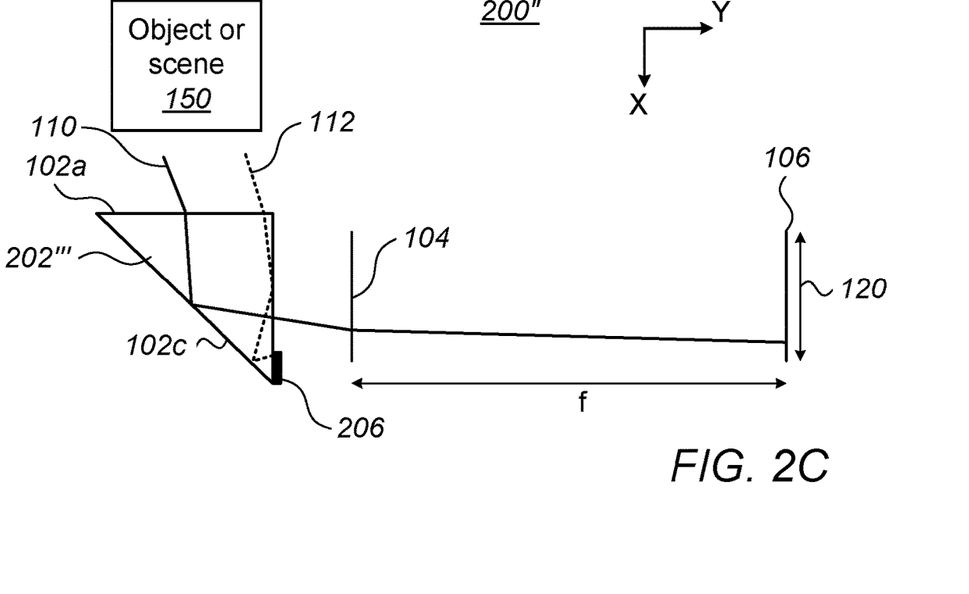
FIG. 2C shows schematically yet another camera embodiment for preventing DRSL of type 1.

FIG. 2C shows schematically yet another example of a folded camera embodiment numbered 200" that has a construction that prevents DRSL of type 1 from reaching image sensor 106. In this example, a prism 202'" has an added cover 206 that blocks stray rays 112 at the exit from the prism on the bottom side of exit surface 102b. Cover 206 may be similar to cover 204 in terms of material, formation and dimensions. For example, cover 206 may have a width 5%-10% of the height (in the X direction) of exit surface 102b and be the same depth as exit surface 102b in the Z direction.

In summary, any of the three camera embodiments 200, 200' and 200" have a construction that prevents stray rays 112 from reaching the lens and the image sensor.

Figure 3A:
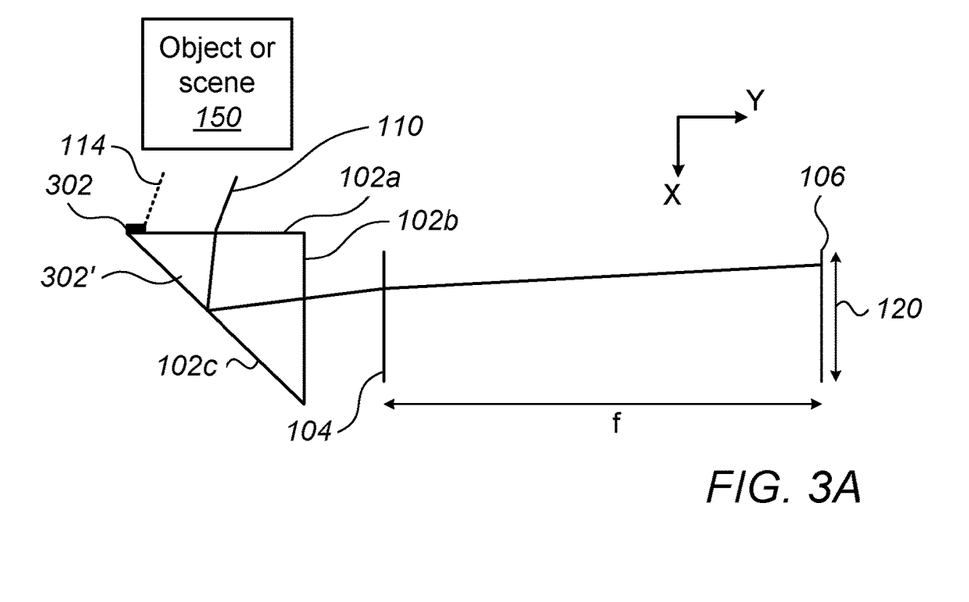
FIG. 3A shows schematically a camera embodiment for preventing DRSL of type 2.
Figure 3B:
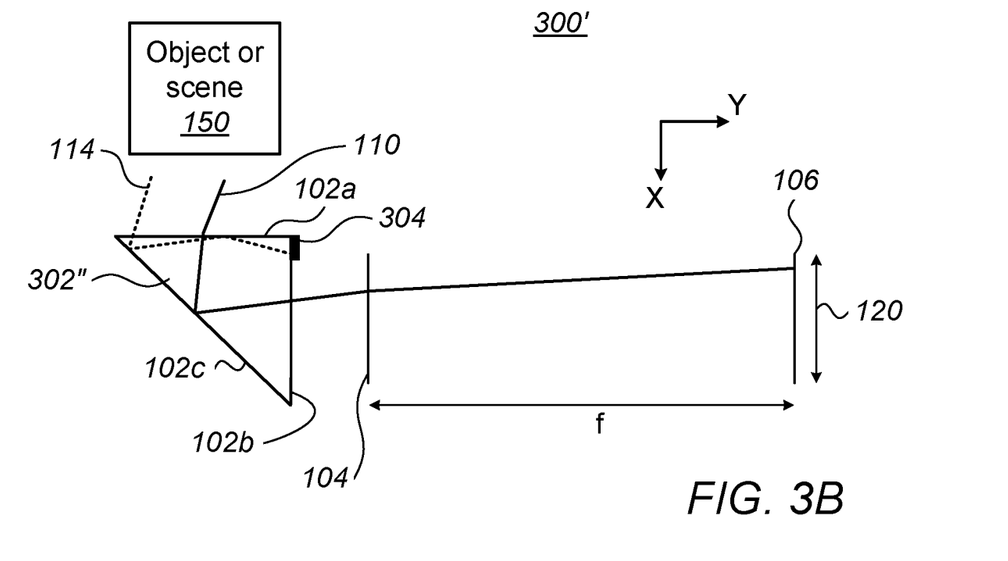
FIG. 3B shows schematically another camera embodiment for preventing DRSL of type 2.
Figure 3C:
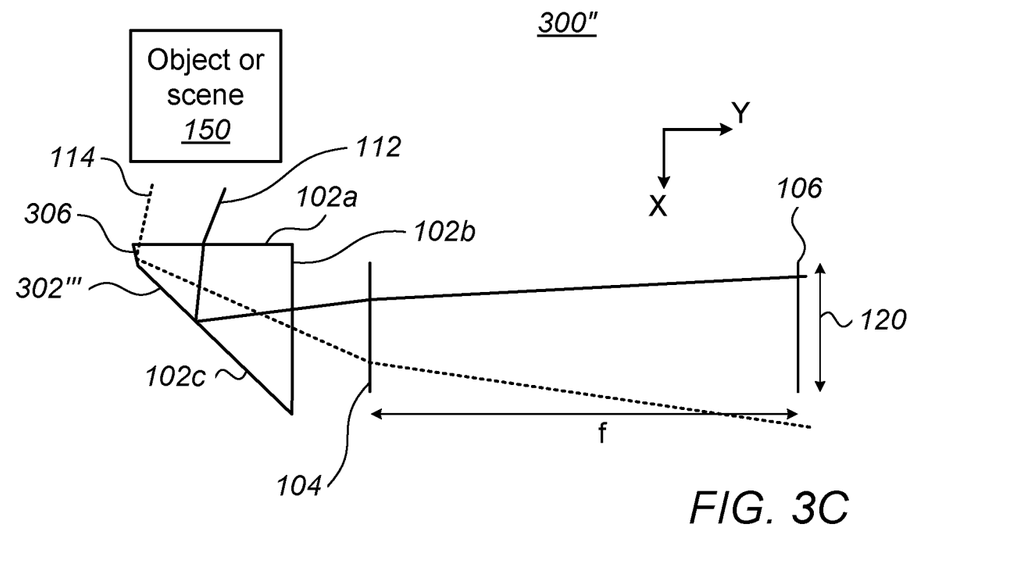
FIG. 3C shows schematically yet another camera embodiment for preventing DRSL of type 2.

FIG. 3A shows schematically an example of a folded camera embodiment numbered 300 that has a construction that prevents DRSL of type 2 from reaching image sensor 106. In this example, a prism 302' has a cover 302 that blocks stray rays 110 at the entrance of prism on the back side of entrance surface 102a. FIG. 3B shows schematically another example of a folded camera embodiment numbered 300' that has a construction that prevents DRSL of type 2 from reaching image sensor 106. In this example, a prism 302" has an added cover (e.g. black mask) 304 that blocks stray rays 114 at the exit of prism on the top side of exit surface 102b. FIG. 3C shows schematically another example of a folded camera embodiment numbered 300" that has a construction that prevents DRSL of type 2 from reaching image sensor 106. In this example, a prism 302'" has an added side facet 306 between entrance surface 102a and reflection surface 102c. Facet 306 may be tilted relative to all or some of the entrance, exit and reflection surfaces (102a-c), namely it may not be parallel to either of these surfaces. Side facet 306 meets stray rays 114 before they arrive at reflection surface 102c. However, a reflection from side facet 306 may occur. Side facet 306 may thus be tilted such that stray rays 114 are reflected at an angle that will cause them not to arrive at image sensor 106. The tilt angle of facet 306 may be of 1-10 degrees relative to entrance surface 102a. For example, side facet 306 may have a height 5%-10% of the height (in the X direction) of exit surface 102b.

Advantageously, side facet 306 may optionally be covered by an opaque mask or material (not shown), such that stray rays 114 are blocked.

Materials and/or formation processes and/or dimensions of facet 306 and covers 302 and 304 may be similar to those of facet 202 and covers 204 and 206.

In summary, using any of the three camera embodiments described with reference to FIGS. 3A-3C, stray rays 114 do not reach the lens and the image sensor.

Figure 4:
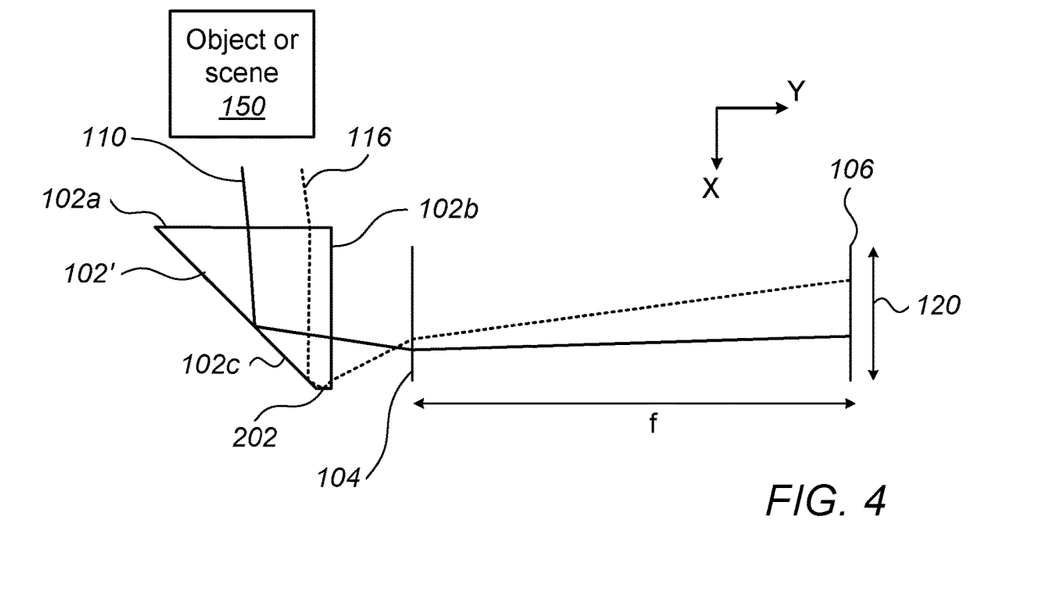
FIG. 4 shows tracing of a stray ray in a prism of a folded camera wherein the prism has a bottom facet.

As seen in FIG. 2A, a bottom facet 202 in prism 202' may solve SL issues. Bottom facet 202 may also reduce the prism height and is thus a desired solution, even regardless of SL issues. However, bottom facet 202 may introduce a new type of DRSL. FIG. 4 shows a tracing of a stray ray 116 in a prism with a bottom facet 202. In the case presented in FIG. 4, stray ray 116 enters the prism through entrance surface 102a, is first reflected from reflection surface 102c and then reflected from bottom facet 202, and exits through exit surface 102b to reach lens 104 and image sensor 106. Namely, ray 116 has one extra reflection from bottom facet 202 relative to rays 110. Light rays like stray ray 116 seen in FIG. 4 will be considered to be a DRSL of type 3.

Figure 5A:
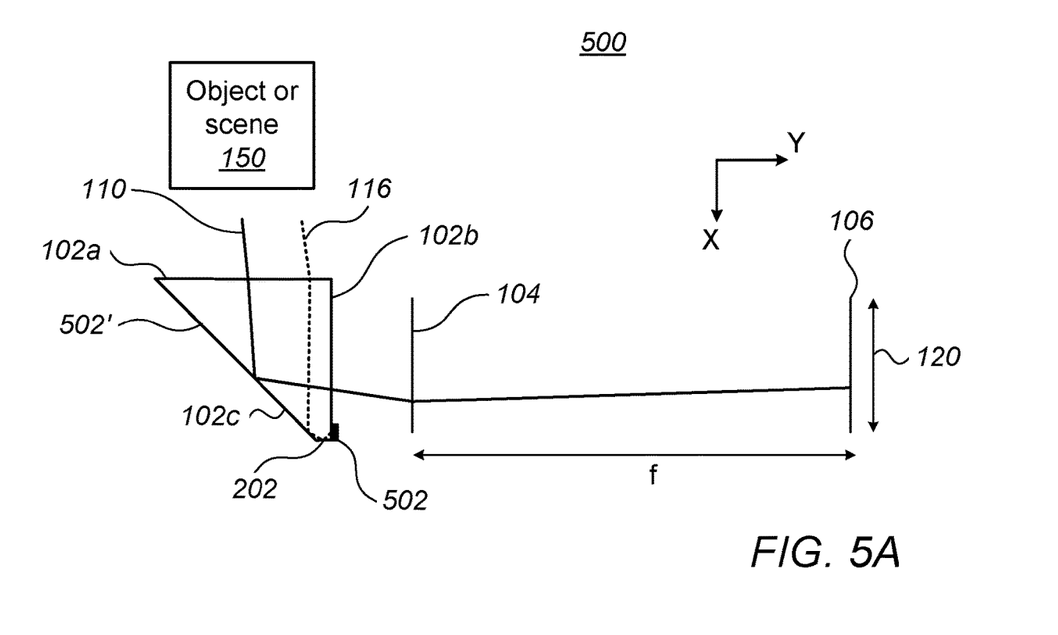
FIG. 5A shows schematically a DRSL of type 3 in a camera embodiment for preventing DRSL of type 3.
Figure 5B:
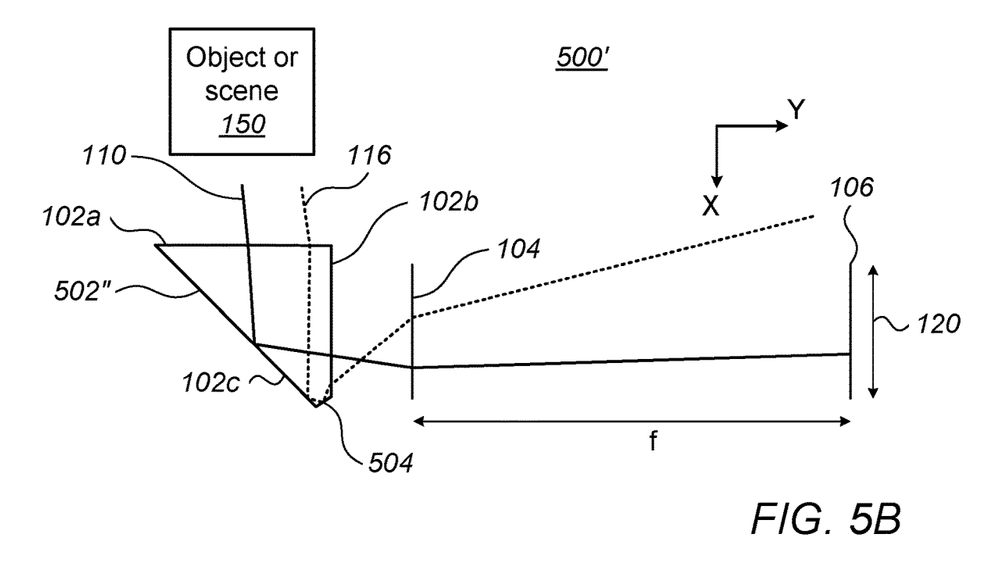
FIG. 5B shows schematically another camera embodiment for preventing DRSL of type 3.

FIG. 5A shows schematically an example of a folded camera embodiment numbered 500 that has a construction that prevents DRSL of type 3 from reaching image sensor 106. In this example, a prism 502' added cover (e.g. black mask) 502 that blocks stray ray 116 at the exit of prism on exit surface 102b. For example, cover 502 may have a width 5%-10% of the length (in the X direction) of exit surface 102b and be the same depth as exit surface 102b in the Z direction. FIG. 5B shows schematically another example of a folded camera embodiment numbered 500' that has a construction that prevents DRSL of type 3 from reaching image sensor 106. In this example, in a prism 502", a tilted bottom facet 504 replaces bottom facet 202 and is tilted such that stray rays 116 are reflected at an angle that will not arrive at image sensor 106. Tilted bottom facet 504 is tilted relative to all or some of the entrance and reflection surfaces (102a, c), namely it is not parallel to either of these surfaces. The dimensions of tilted bottom facet 504 may be for example similar to those of side facet 306, while the tilt angle relative to entrance surface 102a may be 1-10 degrees from the Y axis.

In summary, the seven folded camera embodiments above has a construction that prevents double reflected stray light (DRSL) from reaching the image sensor.

Figure 6A:
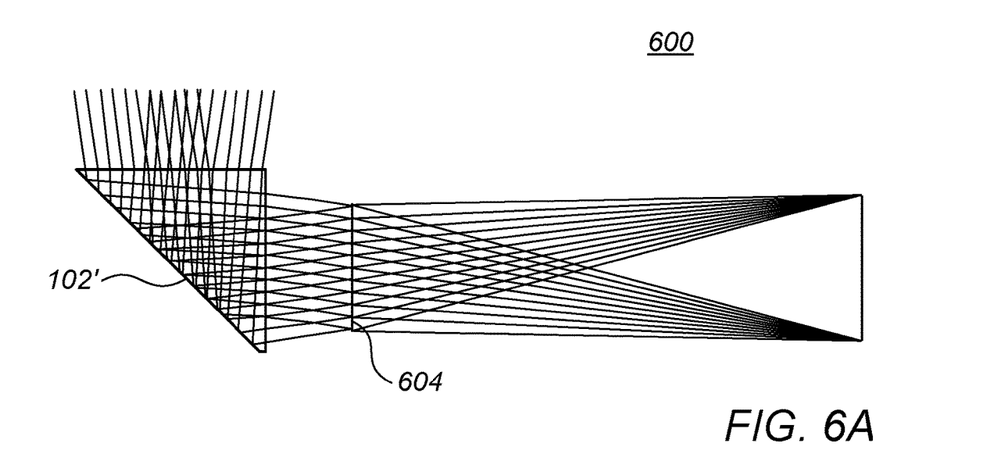
FIG. 6A shows an embodiment of a folded camera similar to the camera in FIG. 1B, where the lens is replaced with a lens having a smaller CA.

Another optional solution for all the DRSL issues may use the blocking of the CA of lens 104. As explained above, DRSL may happen when the prism does not cover the full camera cone of vision, which is dependent on the lens CA. A smaller CA leads to a smaller full camera cone of vision, and thus the prism can cover it. FIG. 6A shows an embodiment of a folded numbered camera 600 (with ray tracing) similar to camera 100', where lens 104 is replaced with a lens 604 having a smaller CA. In this case, prism 102' does cover the full camera cone of vision. However, a decrease in CA is typically unwanted, due to a decrease in the amount of light entering the lens and an increase in the lens f-number (the f-number is a known term in optics and is the ratio between the lens focal length and the CA diameter).

Figure 6B:
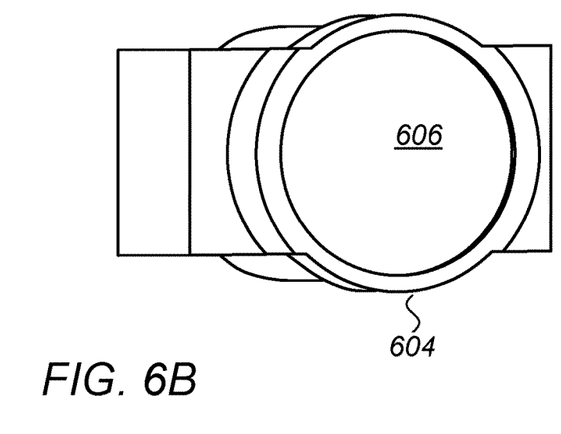
FIG. 6B shows an example of a lens as in the camera of FIG. 6A with a full lens aperture and CA.
Figure 6C:
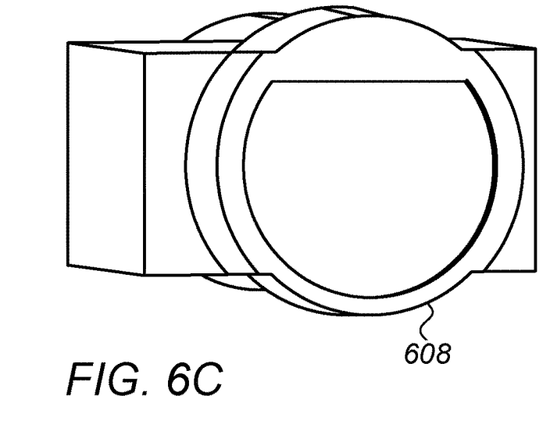
FIG. 6C shows an embodiment of a lens barrel in which the lens clear aperture is partially blocked.
Figure 6D:
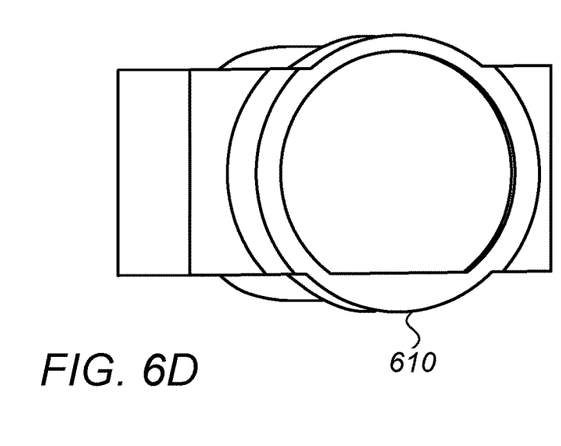
FIG. 6D shows another embodiment of a lens barrel in which the lens clear aperture is partially blocked.
Figure 6E:
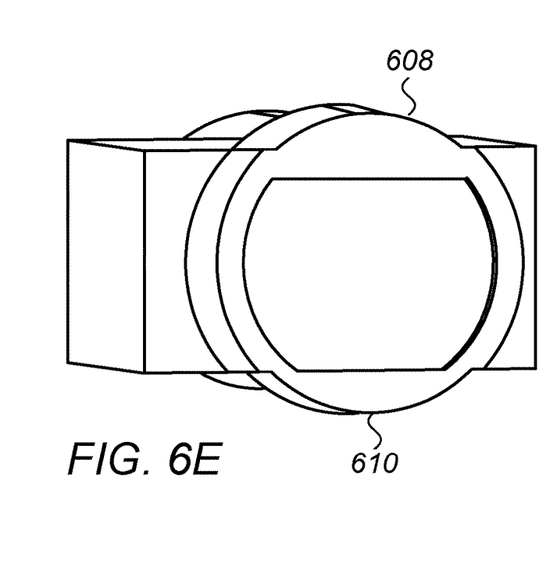
FIG. 6E shows yet another embodiment of a lens barrel in which the lens clear aperture is partially blocked.

FIG. 6B shows an example of a lens assembly 604 with a full lens aperture and CA 606. FIGS. 6C-6E show lens barrel embodiments in which the clear aperture of the lens is blocked in a non-axisymmetric manner, namely by blocking the top (608) and/or bottom (610) sides of the lens CA. The blocking offered in FIGS. 6C-6E allows reduction of the full camera cone of vision with a less decrease in the amount of light entering the lens compared to a solution in that reduces the lens CA. Thus, using blocks 608 and/or 610 may block DRSL of type 1 like stray rays 112 or 114 and/or DRSL of type 3 like stray ray 116.

Figure 7:
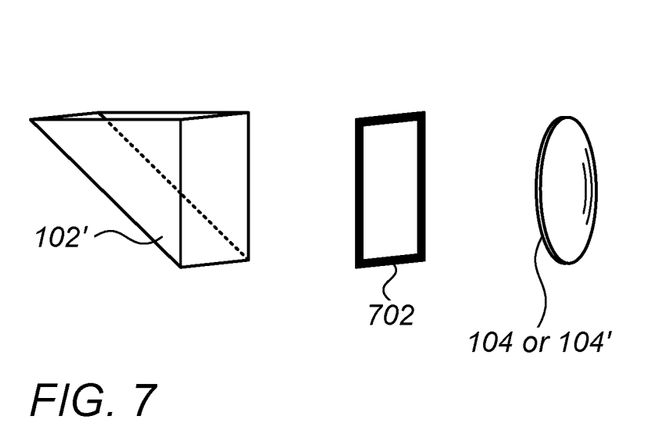
FIG. 7 shows yet another embodiment of a lens barrel in which the lens clear aperture is partially blocked.

FIG. 7 shows another option for blocking the clear aperture. In FIG. 7, a light blocking element such as a mask 702 is used to block the camera cone of vision, thus causing a blocked camera cone of vision. The use of mask 702 may block DRSL of type 1 like stray rays 112 or 114 and/or DRSL of type 3 like stray ray 116.

In general, DRSL of type 1, 2 or 3 can occur in the same prism. All solutions (blocking features) seen in FIGS. 2A-C, 3A-C, 5A-C, 6B-6E and 7 can be used simultaneously or in any combination to decrease or eliminate DRSL.

All figures showing a prism from a side cut (FIGS. 1C-1F, 2A-2C, 3A-3C, 4, 5A-B, 6A) may have exemplarily all faces and facets of the same depth (measured along Z direction, perpendicular to the first and second optical paths). All figures showing a prism from a side cut (FIGS. 1C-1F, 2A-2C, 3A-3C, 4, 5A-B, 6A) may have exemplarily all faces and facets of not the same depth (measured along Z direction, perpendicular to the first and second optical paths), namely have faces and facets with varying depth.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present invention.

What is claimed is:

1. A folded camera, comprising:
   a) a lens having a lens optical axis;
   b) an image sensor; and
   c) a prism for folding light from a first optical path to a second optical path towards the image sensor, the second optical path being along the lens optical axis, wherein the folded camera has a full camera cone of vision, wherein the prism intersects the full camera cone of vision, wherein the folded camera has a camera construction that prevents double reflected stray light (DRSL) from reaching the image sensor in the form of a facet formed at the bottom of the prism, wherein the facet is covered by an opaque mask and has a length that is sufficient to prevent DRSL type 1 rays from reaching the image sensor.

2. A folded camera, comprising:
   a) a lens having a lens optical axis;
   b) an image sensor; and c) a prism for folding light from a first optical path to a second optical path towards the image sensor, the second optical path being along the lens optical axis, wherein the folded camera has a full camera cone of vision, wherein the prism intersects the full camera cone of vision and wherein the folded camera has a camera construction that prevents double reflected stray light (DRSL) from reaching the image sensor in the form of a side facet formed on the prism and wherein the side facet is covered by an opaque mask.

3. A folded camera, comprising:
a) a lens having a lens optical axis, wherein the lens has a circular full lens aperture and wherein an actual lens aperture has a D-cut circle shape;
b) an image sensor; and
c) a prism for folding light from a first optical path to a second optical path towards the image sensor, the second optical path being along the lens optical axis, wherein the folded camera has a full camera cone of vision, wherein the prism intersects the full camera cone of vision, wherein the folded camera has a camera construction that prevents double reflected stray light (DRSL) from reaching the image sensor in the form of a tilted facet formed at the bottom of the prism, wherein the tilted facet has a length that is sufficient to prevent DRSL type 1 rays from reaching the image sensor.

4. A method, comprising:
a) providing a folded camera that includes a lens having a lens optical axis, an image sensor and a prism for folding light from a first optical path to a second optical path along the lens optical axis towards the image sensor, wherein the lens has a circular full lens aperture, wherein an actual lens aperture has a D-cut circle shape, and wherein the folded camera has a full camera cone of vision and wherein the prism intersects the full camera cone of vision; and
b) forming a facet at the bottom of the prism, wherein the facet has a length that is sufficient to prevent double reflected stray light (DRSL) type 1 rays from reaching the image sensor.

\* \* \* \* \*